(12) United States Patent
Slanec

(10) Patent No.: US 7,127,964 B2
(45) Date of Patent: Oct. 31, 2006

(54) PEDAL ARRANGEMENT FOR A MOTOR VEHICLE WITH A DISPLACEMENT SENSOR UNIT

(75) Inventor: Konrad Slanec, St. Julians (MT)

(73) Assignee: Methode Electronics Malta Ltd. (MT)

( * ) Notice: Subject to any disclaimer, the term of this patent is extended or adjusted under 35 U.S.C. 154(b) by 45 days.

(21) Appl. No.: 10/221,509

(22) PCT Filed: Mar. 13, 2001

(86) PCT No.: PCT/IB01/01152

§ 371 (c)(1),
(2), (4) Date: Dec. 11, 2002

(87) PCT Pub. No.: WO01/68404

PCT Pub. Date: Sep. 20, 2001

(65) Prior Publication Data

US 2003/0188600 A1  Oct. 9, 2003

(30) Foreign Application Priority Data

Mar. 13, 2000 (DE) ................................ 100 12 179

(51) Int. Cl.
*G05G 1/14* (2006.01)
(52) U.S. Cl. ....................................................... 74/514
(58) Field of Classification Search .......... 74/512–514, 74/560
See application file for complete search history.

(56) References Cited

U.S. PATENT DOCUMENTS

| 3,650,581 | A | * | 3/1972 | Boden et al. | ............... 310/90.5 |
| 4,129,047 | A | * | 12/1978 | Dornan | ..................... 74/473.17 |
| 4,327,414 | A | | 4/1982 | Klein | ......................... 364/426 |
| 4,884,550 | A | * | 12/1989 | Bird et al. | .................. 123/587 |
| 5,241,936 | A | * | 9/1993 | Byler et al. | ................. 123/399 |
| 5,477,116 | A | * | 12/1995 | Journey | ..................... 318/551 |

(Continued)

FOREIGN PATENT DOCUMENTS

DE  4119063 A * 12/1992

(Continued)

*Primary Examiner*—Chong H Kim
(74) *Attorney, Agent, or Firm*—Jacobson Holman PLLC

(57) ABSTRACT

The invention relates to a sensor unit, integrated in a pedal-box, for the determination of the angular position of a pedal lever (1), in the form of an inductive non-contact separation sensor, comprising a stationary sensor head (3) and a sensor element (4), moving with the pedal lever (1). The sensor head (3), oriented transverse to the pedal axis (6), is directed at the sensor element (4), which moves with the pivoting pedal lever (1) in the direction of the main sensor, such as to alter the separation. The separation of the sensor head (3) and the sensor element (4) influences the electrical signal generated by the sensor head (3), from the values of which, inferences can be drawn about the position of the pedal. Two adjacent pedal levers (1) are arranged on a common housing (5), each with one of the integrated sensor heads (3).

18 Claims, 2 Drawing Sheets

U.S. PATENT DOCUMENTS

| | | | |
|---|---|---|---|
| 5,768,946 A * | 6/1998 | Fromer et al. | 74/514 |
| 6,220,222 B1 * | 4/2001 | Kalsi | 123/399 |
| 6,223,865 B1 * | 5/2001 | Lang et al. | 188/73.31 |
| 6,253,635 B1 * | 7/2001 | Huber | 74/512 |
| 6,263,758 B1 * | 7/2001 | Kumamoto et al. | 74/513 |
| 6,332,374 B1 * | 12/2001 | Someda et al. | 74/514 |
| 6,401,566 B1 * | 6/2002 | Beale et al. | 74/512 |
| 6,408,712 B1 * | 6/2002 | Bolisetty et al. | 74/514 |
| 6,450,061 B1 * | 9/2002 | Chapman et al. | 74/512 |
| 6,460,429 B1 * | 10/2002 | Staker | 74/513 |
| 6,474,191 B1 * | 11/2002 | Campbell | 74/514 |
| 6,571,662 B1 * | 6/2003 | Mendis | 74/514 |

FOREIGN PATENT DOCUMENTS

| | | |
|---|---|---|
| DE | 198 28 533 | 1/2000 |
| DE | 198 28 553 | 2/2000 |
| WO | 95/08751 | 3/1995 |

* cited by examiner

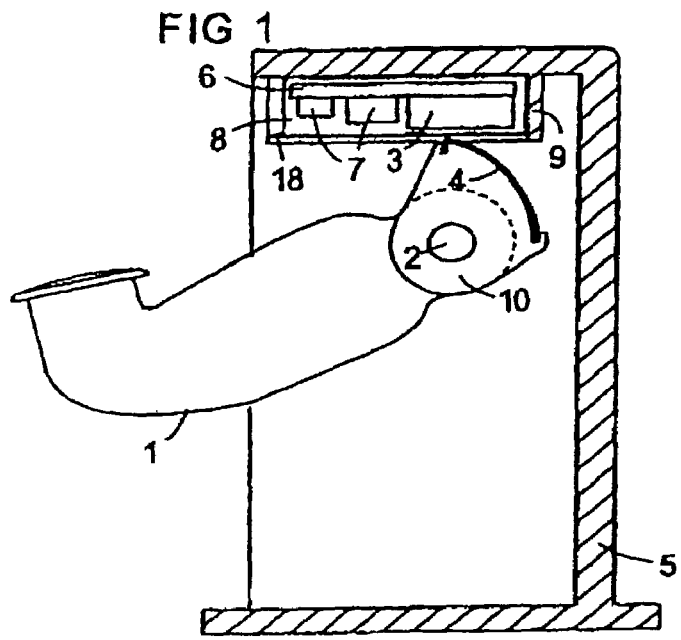
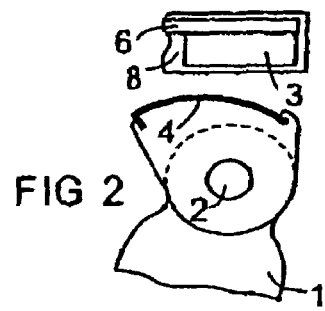
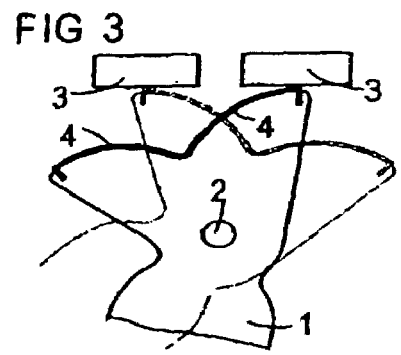
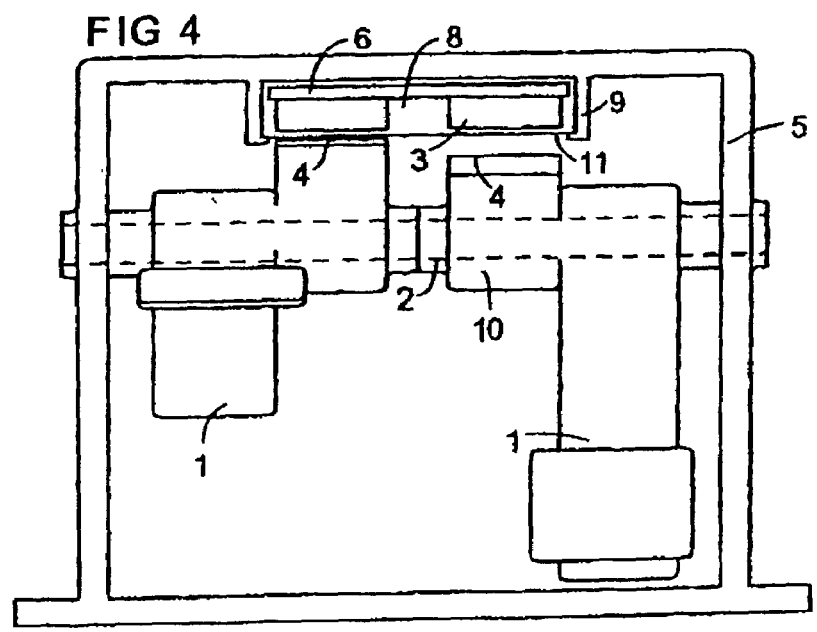

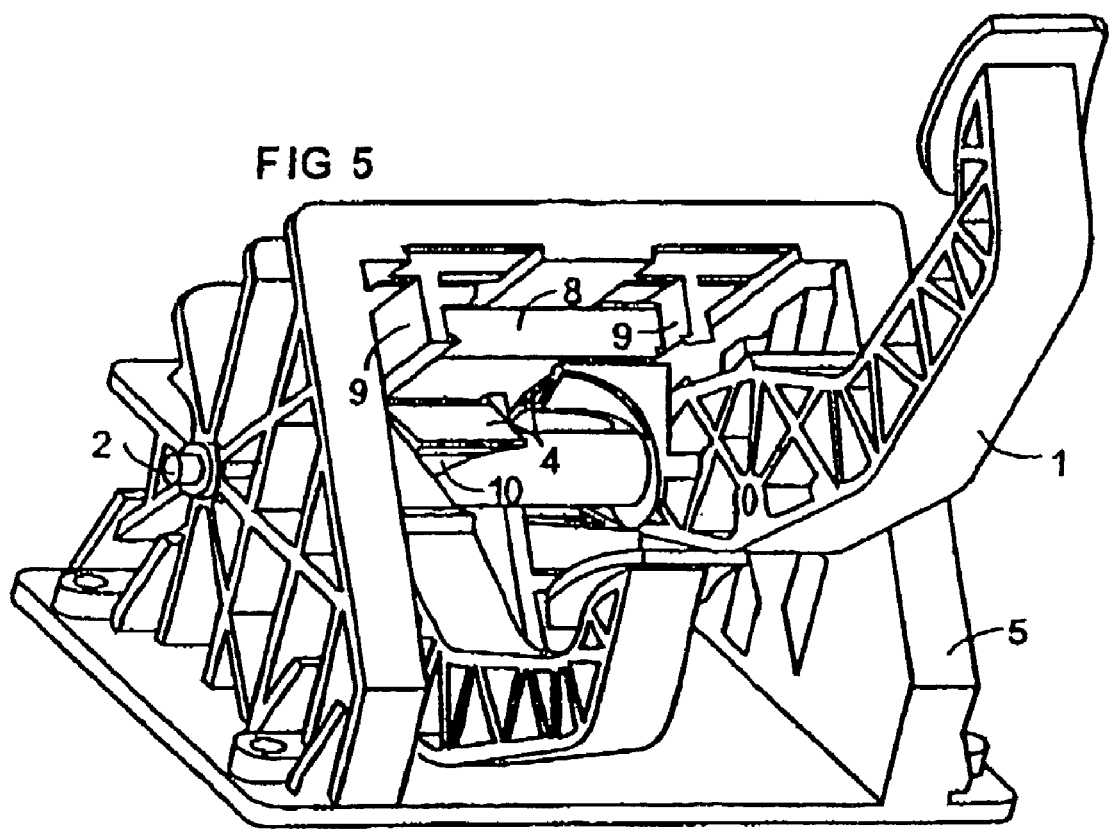
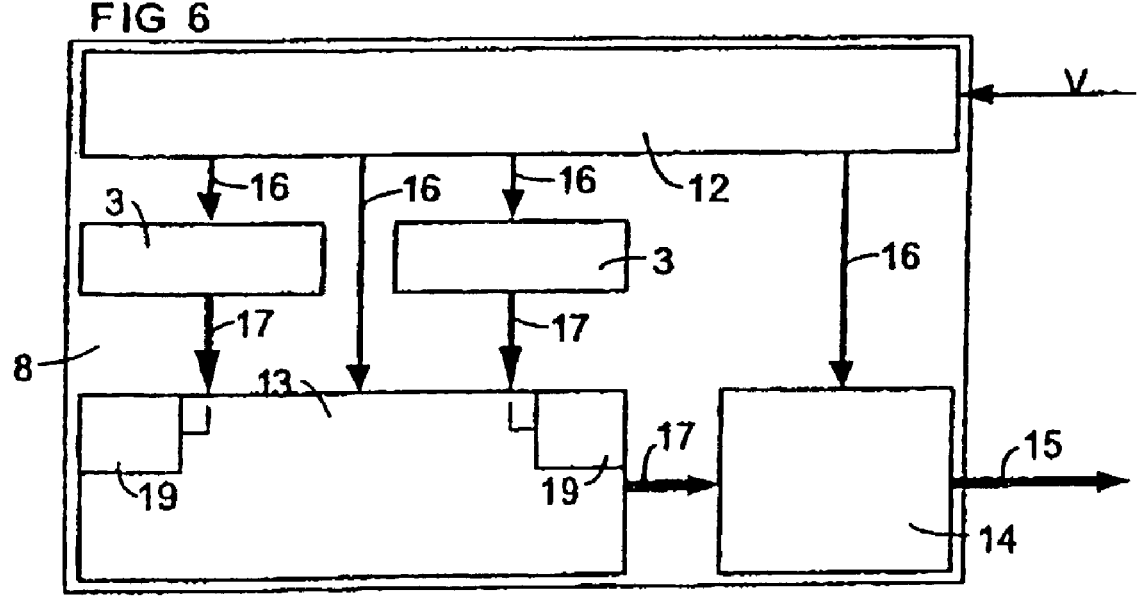

PEDAL ARRANGEMENT FOR A MOTOR VEHICLE WITH A DISPLACEMENT SENSOR UNIT

This is a nationalization of PCT/IB01/01152 filed Mar. 12, 2001 and published in German.

BACKGROUND OF THE INVENTION

1. Field of the Invention

The present invention relates to a pedal device for automobiles with pedal levers that are neighboring each other, and with assembly locations for the sensor units that detect the pedal positions, which each include at least one stationary sensor head and at least one movable sensor element that is kinematically linked to the pedal lever, which is arranged in the effective range of the respective sensor head.

2. Description of Related Art

Such a device is described, for instance, in the German patent application 19958241.6, according to which the sensor unit is embodied as an inductive distance sensor, the stationary sensor head of which is embodied as a coil component, and the sensor element is embodied as a metal component. The coil component and an electronic conversion unit for its output signal are fastened on a mutual carrier component.

Furthermore it is common that, for instance, a clutch pedal and a neighboring braking pedal are combined in a mutual body, on which the pedal levers are supported.

Further, a rotary angle sensor has been known from U.S. Pat. No. 6,253,635, in which a pedal lever is rotatably linked with the sensor, which is usually a rotary potentiometer, with the circumferential displacement of a rotary sensor element being detected by means of a slide contact.

SUMMARY OF THE INVENTION

A measurement device for the digital determination of the pivot angle of a brake pedal has been known from U.S. Pat. No. 4,327,414 A, in which an angle scale is formed by means of electromagnetic detectable, radially distanced teeth of a measurement segment that is connected to the pedal. Two inductively sensible spools are directed toward the pedal axis onto the teeth that pivot laterally toward the spool axis on the face side, and detect their presence or absence. In order to enable constant counting impulses, the tooth segment must be arranged exactly concentric toward the pedal axis. The spool axis must be exactly aligned to the tooth segment during assembly. Two spools are required in order to differentiate the pivot direction.

Furthermore, a sensor device for the detection of the pivot angle of a steering column is known from WO9508751, in which the distance of a high frequency spool (FIG. 2) to a pivoting curve disk is determined according to the different resonance frequencies, which require a substantial amount of control and evaluation.

The present invention is based on the task of creating a device that can be produced at a low expenditure, and that enables an exact angle determination in a full pivot range.

This task is solved in accordance with the present invention which is directed to a pedal device for automobiles with pedal levers that are neighboring each other, and with assembly locations for the sensor units that detect the pedal positions. The sensor units include at least one stationary sensor head and at least one movable sensor element that is kinematically linked to the pedal lever and is arranged in the effective range of the respective sensor head. The main effective sensing directions of the sensor heads are arranged approximately vertical to the pedal axis and parallel to each other, with the sensor elements being assigned to their respective pedal levers in such a way that they are movable toward the sensing face of the sensor heads in a distance changing manner in their effective direction.

With the orientation of the sensor heads vertical to the pedal axis, their main effective direction can be radial or tangential. The sensor elements are always positioned in this effective range so that the sensor signals directly depend on their distances. In this way, many different pedal positions can be exactly assigned in a wide range of angles. As the sensor heads point in the same direction, it is easily possible to arrange them on a common circuit board at approximately the same height, whereby a lateral offset on the circuit board level has only a minor effect on the measurement values. This requires only an adjustment in the effective direction that can occur individually for each sensor for the signal calibration in the idle state of the respective pedal, for example, by means of a mechanical adjustment of the movable sensor element, or preferably by means of an electronic alignment of the signal values.

The electronic adjustment of, for instance, capacitively, inductively, magnetically, or acoustically operating sensor units does not require a mechanical alignment between the sensor elements and the assigned sensor heads so that they can be assembled into the pedal device at a fixed positional relation to each other, which is possible in a simple assembly process without any mechanical alignment.

As the finishing, assembly, and adjustment expenditure for the two sensor units is only slightly higher than for one, it is possible to generally construct the pedal device for both sensor units, even in the case that the customer wishes to control only one of the pedals. In this case, the assembly position is simply not equipped with a second sensor head.

Advantageous further embodiments of the present invention are summarized as follows.

In a particularly advantageous arrangement of the functional elements of the present invention, all sensor heads are combined in one common assembly unit, the pedal device has a common body for both pedal levers, and the assembly unit is directly anchored inside of the body. The entire pedal body thus forms a complete functional module with the pedals and the sensor heads, and the optional accessories for the same, in which all sensor functions are combined in addition to the mechanical functions, and that is therefore also embodied as a complete sensor unit. This arrangement of all the elements requires little adjustment and a minimum of manufacturing tolerances. By means of the uniform alignment of the sensor heads, the sensor unit can also be comprised of several pedal lever positions without the complex arrangement requiring a higher adjustment effort. The assembly unit can be equipped with one or several sensor heads depending on the customer's wishes without requiring any special adjustment measures.

By means of combining both active sensor heads on the circuit board such that the sensor heads are attached to a flat side of a common circuit board of the assembly unit, the manufacture and assembly expenditure for the assembly unit is reduced. The circuit board forms a level base for the sensor heads and aligns their height and effective direction in their idle state without any special efforts. A particular advantage is that the electric connections for the power supply, or the data, respectively, can be made via a common connection interface and common cables.

Within the assembly unit according to the present invention, the circuit board may carry additional electric and electronic assembly elements for the power supply and for controlling the sensor heads, as well as for the evaluation of the detector signals created by the sensor heads. The circuit board with its assembly elements and an optional plastic body forms an autonomous assembly unit with a common power supply for both sensor heads and a common evaluation device. Such an assembly unit represents a complete assembly group with a minimum of exterior connections. It is especially important that the sensor heads and the respective electric and electronic elements form, for instance, a firm connection via a common circuit board, which enables an exact alignment and a safe assignment. A particular advantage is that a damaged assembly unit or an assembly unit to be upgraded can be replaced without any problem, and without any mechanical adjustment.

It is possible by means of evaluation electronics to reduce the electronics effort. For example, both sensor heads can be connected in the multiplex with the same electronic elements. In this regard, it is particularly advantageous that the electronics assembly functions only with one of the relatively expensive micro-controllers. If the applied safety philosophy provides for the doubling of the sensor assembly and the electronics assembly, the cost savings effect will become even more significant.

The evaluation electronics assembly may be equipped with memory spaces that are assigned to the individual sensor heads for the correction values for the individual sensor heads that are gained from the adjustment processes. With these memory spaces it is possible to construct the assembly unit as a complete functional module that delivers standardized output values so that the assembly or an exchange requires no additional adjustment to the vehicle's electronics assembly.

The sensor units may be embodied as inductive distance sensors that include at least one spool component serving as the sensor head, and at least one metal component forming the sensor element. Such an embodiment of the sensor units as inductively operating distance sensors, or distance sensors operating according to the eddy current principle, has the advantage that the signal values are largely unaffected by environmental influences, such as by magnetic fields. In a Hall sensor according to prior art, the risk exists that the magnetic characteristics change, especially due to the build-up of iron particles, and therefore its output signals also change.

The body may have a fixed assembly location for the assembly unit which eases the assembly of the assembly unit and the exact assignment of the sensor elements to the sensor heads.

The body may have clearings for the sensor elements in the area of the sensor heads. By means of the clearing, it is possible to introduce the sensor elements in close proximity to the sensor heads, and thereby increase the sensitivity of the sensor unit.

The body may further have a plug-in receptacle for the assembly unit, and the assembly unit may be configured to be snapped into the plug-in receptacle. The assembly unit may also be equipped with plug-in connectors for external electrical connections. The plug-in receptacle eases the assembly and the exchange of the assembly unit, while the snap-in mechanism enables a simple and safe mount, and the plug-in connectors create a correspondingly simple and safe exterior connection.

By means of a further development in which the sensor elements are arranged in proximity of the pedal axis and are equipped with a spiral-shaped elbow extending around the pedal axis it is possible to create a nearly linear intensity curve in the detected pivot range of the pedals that is particularly easy to evaluate, which eases the adjustment of the system.

An arrangement by which the sensor elements are arranged on the sides of the pedal lever that face each other enables the assembly of both sensor heads at correspondingly close lateral distances, and to construct a compact assembly unit.

According to a further embodiment, at least one of the sensor heads has two spool components to which two oppositely operating sensor elements are assigned, the stationary sensor heads being arranged in proximity to each other. Both oppositely tilted sensor elements are arranged between the pedal axis and the spool components in a butterfly assembly, and all sensor heads are integrated into the assembly unit. This double head increases the redundancy of the sensor system, in which the functional capability remains intact even with a defect on one of the sensor heads. Due to the constant comparison of the measurement values of both sensor heads, defects in one of the sensors can be quickly detected. The counter-rotation of both sensor elements means that they alternate in approaching and distancing to and from the sensor heads. This results in a particularly clear change in a sum or difference signal that is easy to evaluate. The combination of the sensor heads into one assembly unit results in a particularly large cost saving effect.

The assembly unit may further have connections for external electrical signal lines from the surroundings of the pedal device, such that the external signals fed on these lines can be processed in the evaluation electronics assembly of the assembly unit, and the processed external and internal signals can be transmitted to a mutual data bus. Such an assembly unit represents a peripheral electronic sub-center, in which the capacity of the electronic assembly components, and especially of the micro-controller can also be used in order to process the signals from the immediate environment of the pedal device, such as from the steering column, or from the dash board, and to feed them to the mutual data bus. In this regard, it is of advantage that the assembly unit is arranged at a location that is easily accessible, and can therefore be easily exchanged.

BRIEF DESCRIPTION OF THE DRAWINGS

An embodiment example of the invention is illustrated in the drawing and is further explained in detail in the following. They show:

FIG. 1 schematically a section across a pedal device of an automobile,

FIG. 2 another partial section across the pedal device according to FIG. 1, FIG. 3 a partial section across a modified pedal device, FIG. 4 a side view of the pedal device according to FIGS. 1 and 2, FIG. 5 a perspective view of a different pedal device, FIG. 6 a functional diagram of a part of the pedal device according to FIG. 4.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

According to FIG. 1, a pedal lever 1 of a pedal device is pivot-supported around a pedal axis 2 in a body 5 constructed as a pedal trestle that can be mounted into, for example, the pedal area of an automobile. A sensor element 4 consisting of ferromagnetic material is placed onto a pedal lever 1 consisting of, for example, fiberglass reinforced plastic. A stationary attached sensor head 3 in the form of a spool component is located above the pedal lever 1 that induces an electromagnetic alternating field oriented oblique to the pedal axis, and directed toward the sensor element 4, and that forms an inductive sensor unit together with the sensor element 4. The face distance of the sensor element 4 to the sensor head 3 changes depending on the pivot position of the pedal lever 1. This effects a change in the electromagnetic coupling between the sensor head 3 and the sensor element 4, which is reflected in measurable electrical signals.

The sensor element 4 has a convex cam-shaped elbow, the course of which is such that the output signals of the sensor head change nearly proportional to the angle position of the pedal lever 1.

The sensor element 4 has a bending contour that is easy to create, and that can be connected to the pedal lever 1 at a low effort by means of inserting it into a mold for the same. This component of the sensor unit therefore causes no additional costs in the further assembly into the body. The sensor head 3 can be mounted into the pedal area independently of the assembly of the pedal lever 1 without any alternating obstruction. In the base position shown, one end of the sensor element is closely neighboring to the sensor head. The electromagnetic coupling here is correspondingly strong.

The sensor head 3 is attached on a circuit board 6 that carries additional electric and electronic assembly elements 7. These components are integrated into one assembly unit 8 that is embodied as a closed plug-in module, which is inserted into a corresponding plug-in receptacle 9 of the body 5 that is easily accessible, and is fastened in it at a fixed positional relation through snap-in means 18. The assembly unit 8 equipped with a plastic body is equipped with a plug-in connector that is not illustrated in detail, by means of which it can be connected to the electric service lines of the automobile for the power supply and data transmission. The assembly unit 8 is equipped with a closed plastic body that does not influence the electromagnetic field between the sensor head and the sensor element.

According to FIG. 2, the pedal lever 1 is pivoted into a functional position in which the distance to the sensor head 3 is substantially increased. The electromagnetic coupling and therefore the signal have changed correspondingly. By a part of the electronic assembly elements, the sensor signals can be converted into corrected output signals, and processed in another electronic device of the automobile.

According to figure 3, the sensor unit has two neighboring sensor heads 3, on the opposite sides of which two sensor elements are positioned on the pedal lever 1 that have opposite slants relative to one another in a rocker lever manner. Here, both sensor elements are connected with each other in one piece in a butterfly type assembly at the end sections that face each other at a mutual center area, which reduces the production effort. The sensor elements are formed to be eccentric as opposed to the pedal axis 2 in such a way that they alternately approach or distance themselves from the respective sensor head 3. This effects a particularly strong change in the difference signal between the two sensor heads 3.

In the base position indicated by a semicolon outline, one of the sensor elements 4 is closely approximated to one of the sensor heads 3, while the other sensor element 4 is located at the position furthest away from the sensor head 3. In the final position of the foot pedal lever 1 illustrated by a full outline, the distances of the sensor elements have reversed from their sensor heads 3.

FIG. 4 shows the pedal device according to figures 1 and 2 with two of the pedal levers 1 that can be operated independently of each other, for instance, for engaging the brakes or the clutch. The two pedal levers 1 are illustrated in two different functional positions that correspond to those illustrated in figure 1 or 2. They are supported on the mutual continuous pedal axis 2 that is anchored in the sidewalls of the body 5. The pedal levers 1 are equipped with lateral cam-shaped necks 10 in the area of the pedal axis 2 on the sides facing each other, on which the sensor elements 4 are attached. The necks 10 broaden the bearing of the pedal levers 1 on the pedal axis 2. The cylindrical sensor heads 3 that are aligned parallel in regard to their main effective sensing direction are located above the necks 10 on the side of the circuit board 6, the low center distance of which is nearly equal to the center distance between the necks 10, whereby the connection line between the center points of the sensors extends parallel to the pedal axis 2. The circuit board 6 also extends parallel to the pedal axis 2 so that equal electromagnetic coupling conditions result for both sensor units between the sensor heads 3 and their sensor elements 4 that are not affected by any lateral clearance of the pedal levers 1.

The plug-in receptacle 9 is embodied by lateral guide studs that overlap the assembly unit 8 only by little, and therefore keep the movement range of the sensor elements 4 free so that they can be pivoted into the clearing 11 formed in this way up to the immediate proximity of the sensor heads 3.

The body 5, the pedal axis 2, the pedal lever 1, and the assembly unit 8 form a complete pedal mechanism that can be mounted completely prefabricated and tested into the pedal area of the automobile.

FIG. 5 shows such a pedal mechanism in a realistic illustration. The body 5 is embodied as an injection molded body-type plastic body that is reinforced with ribs, just as are the fiberglass reinforced pedal levers 1. The assembly unit 8 is favorably inserted into the plug-in receptacle 9 from the open operation side. Since the assembly unit is arranged in an area of the automobile that is crossed by a variety of other signal lines, it is advantageous to connect such lines to the assembly unit 8 and to utilize their functional elements also for the processing of such external signals, and, if necessary, to equip them with additional functional elements without having to substantially increase the construction and assembly efforts.

FIG. 6 shows a functional diagram of the assembly unit 8 according to FIGS. 1 and 4. The assembly elements 7 (FIG. 1) of the assembly unit 8 form functional units in the shape of a power supply 12, an evaluation electronics assembly 13, and an interface 14. The power supply 12 provided by the onboard system at a standard voltage V is connected to the other functional components (3, 13, 14) via power supply lines 16, which are connected to each other via data lines 17. The two sensor heads 3 send their output signals to the mutual evaluation electronics assembly 13, which performs a signal correction, and which is connected to a signal output 15 leading toward the exterior by means of the interface 14. The evaluation electronics assembly 13 has memory spaces 19 in which correction values characteristic for both sensor heads are stored, which were gained, for instance, in an initial adjustment process.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A pedal device for automobiles with two pedal levers that are neighboring each other, comprising a plurality of sensor units that detect pedal position, each sensor unit including at least one stationary sensor head and at least one movable sensor element that is kinematically linked to a respective one of said pedal levers, said pedal levers being arranged on a pedal axis with the sensor element of each pedal lever being within an effective range of a respective sensor head, each sensor head having an effective sensing direction directed toward a movable sensor element and approximately vertical to the pedal axis, the effective sensing directions of said sensor heads being generally parallel to each other, each sensor element being mounted to a respective pedal lever so as to be movable relative to a sensing face of a respective sensor head in a distance changing manner in said effective sensing direction such that an interface distance between said sensing face and said sensor element changes as said pedal lever pivots on said pedal axis, at least one of the sensor units having two sensor heads to which two oppositely tilted sensor elements are assigned, the stationary sensor heads being arranged in proximity to each other, both oppositely tilted sensor elements being arranged between the pedal axis and the sensor heads in a butterfly arrangement, and all the sensor heads being integrated into a common assembly unit.

2. The pedal device according to claim 1, wherein the pedal device has a common body for both pedal levers, and the assembly unit is directly anchored inside of the body.

3. The pedal device according to claim 2, wherein the sensor heads are attached to a flat side of a common circuit board of the assembly unit, said circuit board extending substantially parallel to said pedal axis so that substantially equal electromagnetic coupling conditions result for each of said plurality of sensor units between the respective sensor heads and corresponding sensor elements.

4. The pedal device according to claim 3, wherein the circuit board carries additional electric and electronic assembly elements for a power supply and for controlling the sensor heads, as well as for evaluation of detector signals created by said sensor heads, said circuit board and assembly elements forming an autonomous assembly unit with a common power supply for both sensor heads and a common evaluation device.

5. The pedal device according to claim 4, wherein an evaluation electronics assembly within said autonomous assembly unit is equipped with memory spaces that are assigned to the individual sensor heads for correction values for the individual sensor heads that are gained from adjustment processes.

6. The pedal device according to claim 1, wherein the sensor units are inductive distance sensors.

7. The pedal device according to claim 2, wherein the body has a fixed assembly location for the assembly unit.

8. The pedal device according to claim 7, wherein the body has clearings for the sensor elements in an area of the sensor heads.

9. The pedal device according to claim 7, wherein the body has a plug-in receptacle for the assembly unit.

10. The pedal device according to claim 9, wherein the assembly unit is snapped into the plug-in receptacle.

11. The pedal device according to claim 1, wherein the sensor elements are arranged on respective sides of the pedal levers that face each other.

12. The pedal device according to claim 5, wherein the assembly unit has connections for external electrical signal lines from outside the pedal device, the external signals fed on these lines being processed in the evaluation electronics assembly of the assembly unit, and the processed external and internal signals being transmitted to a mutual data bus.

13. A sensor device for detecting pedal position in an automobile with two pedal levers that are neighboring each other, comprising:
    a pair of pedal levers pivotally mounted on a common pedal axis;
    a pair of stationary sensor heads mounted adjacent one another in an assembly unit, an effective sensing direction of sensing faces of said sensor heads being approximately vertical to said pedal axis;
    a pair of movable sensor elements, each movable sensor element being kinematically linked to a respective one of said pedal levers so as to move relative to the sensing face of a respective sensor head in a distance changing manner in said effective sensing direction such that an interface distance between said sensing face and said sensor element changes as of said pedal lever pivots on said pedal axis, said sensor heads detecting said movement;
    electronic assembly elements on a common circuit board within said assembly unit evaluating detection signals received from said sensor heads to detect both pedal positions; and
    at least one of the sensor units having two sensor heads to which two oppositely tilted sensor elements are assigned, the stationary sensor heads being arranged in proximity to each other, both oppositely tilted sensor elements being arranged between the axis and the sensor heads in a butterfly arrangement, and all the sensor heads being integrated into a common assembly unit.

14. The sensor device according to claim 13, wherein the sensor heads are attached to a flat side of the common circuit board of the assembly unit, said circuit board extending substantially parallel to said pedal axis so that substantially equal electromagnetic coupling conditions result for each of said plurality of sensor units between the respective sensor heads and corresponding sensor elements.

15. The sensor device according to claim 13, wherein the circuit board carries electronic assembly elements for a power supply and for controlling the sensor heads, said circuit board and assembly elements forming an autonomous assembly unit with a common power supply for both sensor heads and a common evaluation device.

16. The sensor device according to claim 15, wherein said autonomous assembly unit is equipped with memory spaces that are assigned to the individual sensor heads for correction values for the individual sensor heads that are gained from adjustment processes.

17. The pedal device according to claim 1, wherein said effective sensing direction of said sensor heads is substantially perpendicular to said pedal axis, and said sensor elements are arranged to be eccentric relative to the pedal axis such that said sensor elements alternately approach or distance themselves from said sensor heads.

18. The sensor device according to claim 13, wherein said effective sensing direction of said sensor heads is substantially perpendicular to said pedal axis, and said sensor elements are arranged to be eccentric relative to the pedal axis such that said sensor elements alternately approach or distance themselves from said sensor heads.

* * * * *